United States Patent [19]

Brown, Jr. et al.

[11] Patent Number: 4,497,641
[45] Date of Patent: Feb. 5, 1985

[54] APPARATUS AND METHOD FOR DUST CONTROL BY CONDENSATION ENLARGEMENT

[75] Inventors: James T. Brown, Jr.; Frank D. Schowengerdt, both of Golden, Colo.

[73] Assignee: Colorado School of Mines, Golden, Colo.

[21] Appl. No.: 553,038

[22] Filed: Nov. 18, 1983

[51] Int. Cl.³ .............................................. B01D 47/06
[52] U.S. Cl. ............................................ 55/94; 55/233; 55/240; 261/153
[58] Field of Search ................. 55/80, 90, 94, 220, 55/222, 233, 240, 269; 165/60; 261/101, 142, 153

[56] References Cited

U.S. PATENT DOCUMENTS

| | | | |
|---|---|---|---|
| 3,385,575 | 5/1968 | Hall | 55/90 |
| 3,395,510 | 8/1968 | Baines | 55/222 X |
| 3,523,681 | 8/1970 | Saye | 261/142 |
| 3,704,570 | 12/1972 | Yardenoier | 55/222 X |

Primary Examiner—Charles Hart
Attorney, Agent, or Firm—Edwin H. Crabtree

[57] ABSTRACT

An apparatus and method of controlling dust by enlarging and collecting dust particles through vapor nucleation and condensation. The dust particles are enlarged from sizes less than one micron to as large as ten microns. The apparatus and method can greatly improve dust control in mines and other industrial environments.

10 Claims, 4 Drawing Figures

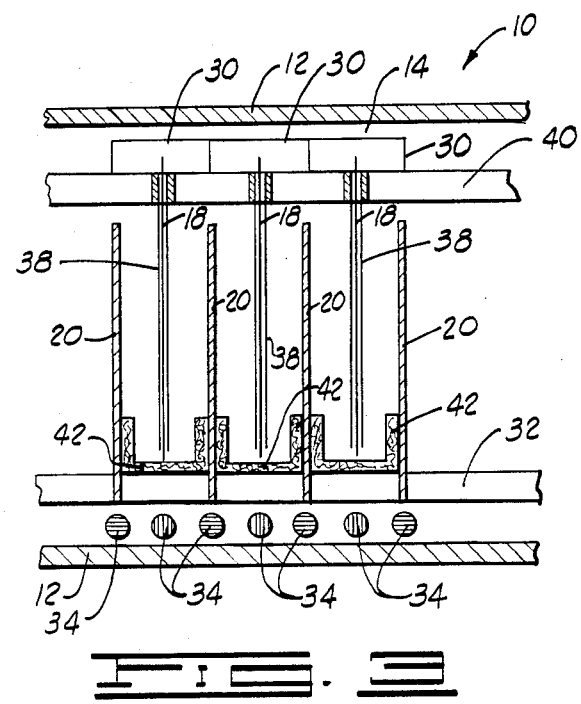
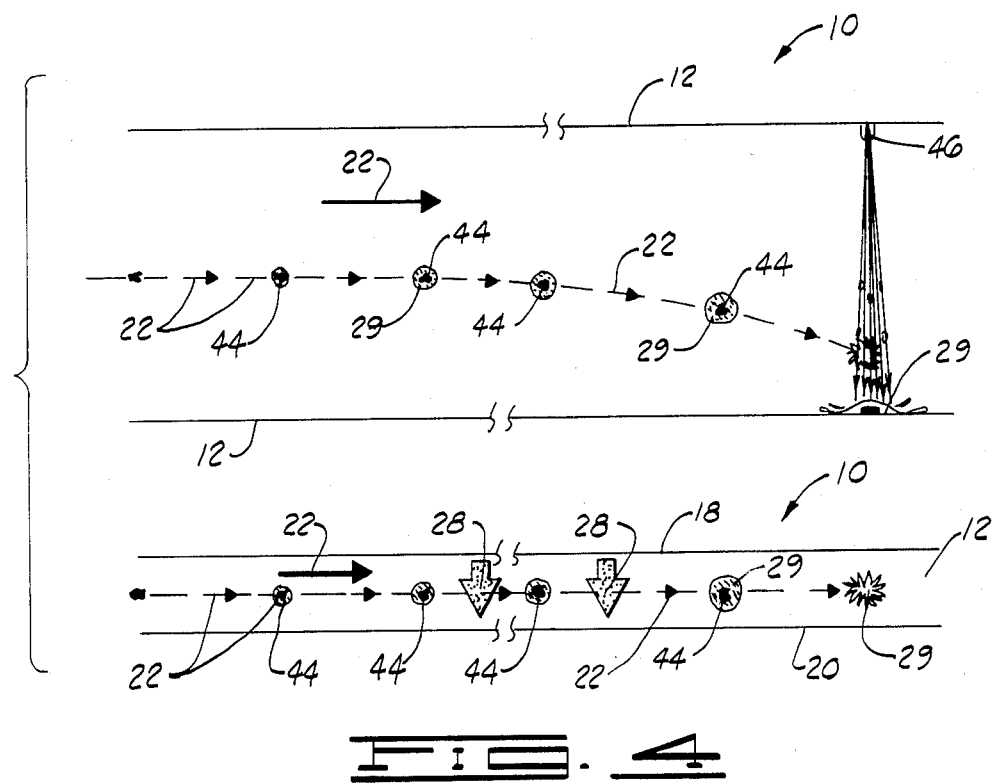

APPARATUS AND METHOD FOR DUST CONTROL BY CONDENSATION ENLARGEMENT

BACKGROUND OF THE INVENTION

This invention relates to an apparatus and method for dust control by condensation with liquid vapor and more particularly but not by way of limitation to dust control by condensation enlargement of dust particles less than one micron to as large as ten microns.

In underground mining operations, the mainstay for dust control has been water sprays. Also various types of electrostatic precipatators and inertial separators have been used. These types of dust collectors present noise problems, space problems and particularly the electro-static precipatators present a potential safety problem in coal mines in the presence of methane gas and coal dust. Also, because of space, noise and safety considerations, conventional dust scrubbers do not lend themselves to underground mining conditions.

Further, water spray and most inertial separators, unless operated at a very high energy input level, fall to near zero efficiency for collecting particles less than five microns.

Dust particles less than five microns penetrate the upper respiratory track and only those particles smaller than about two microns are likely to be trapped in the alveoli. These particles which are deposited in the alveoli give rise to coal miners pneumoconiosis, commonly known as black lung disease, silicosis and other potentially fatal respiratory pathologies.

SUMMARY OF THE INVENTION

The subject invention provides a means for effectively increasing the size of dust particles by condensation enlargement and removal of the particles to reduce respiratory disorders which are common when working underground.

The apparatus and method for controlling dust particles by condensation enlargement have been developed for use in mining equipment and industrial applications where the dust-laden air is a potential health or environmental threat.

The apparatus and method have been thoroughly tested. When proper temperature differentials are maintained, dust particle nucleation efficiency as high as 95 percent was measured resulting in an overall mass removal efficiency greater than 99 percent at flow rates of 10 cubic feet per minute and an efficiency of 80 percent at 50 cubic feet per minute.

Further, the apparatus is scalable to capacity of at least 300 cubic feet per minute which would be sufficient for full scale mining and other large applications.

The apparatus consists of hot and cold plates mounted vertically in a housing. A hot water source is connected to the top of the hot plates for introducing hot water onto the hot plates. Cold plates are mounted vertically in the housing and indexed between the hot plates and parallel thereto. The dust-laden air is introduced into the housing and between the hot and cold plates. The cold plates are cooled by freon cooling coils. The water is heated in a hot water reservoir with the hot plates connected to heaters. The water vapor diffuses from the hot plates to the cold plates, intercepting the dust particles in the region between the plates. The dust particles are nucleated and grow to a size where they will fall out or be collected by a water spray. Water sprays are mounted at the far end of the housing to enhance the collection of the particles. The particles and water are collected at the bottom of the housing, forming a slurry which is discharged from the housing.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 illustrates in greater detail additional structure connected to the hot and cold plates.

FIG. 4 illustrates the flow of dust-laden air and the condensation enlargement of the dust particles.

DETAILED DESCRIPTION OF THE DRAWINGS

Figure 1:
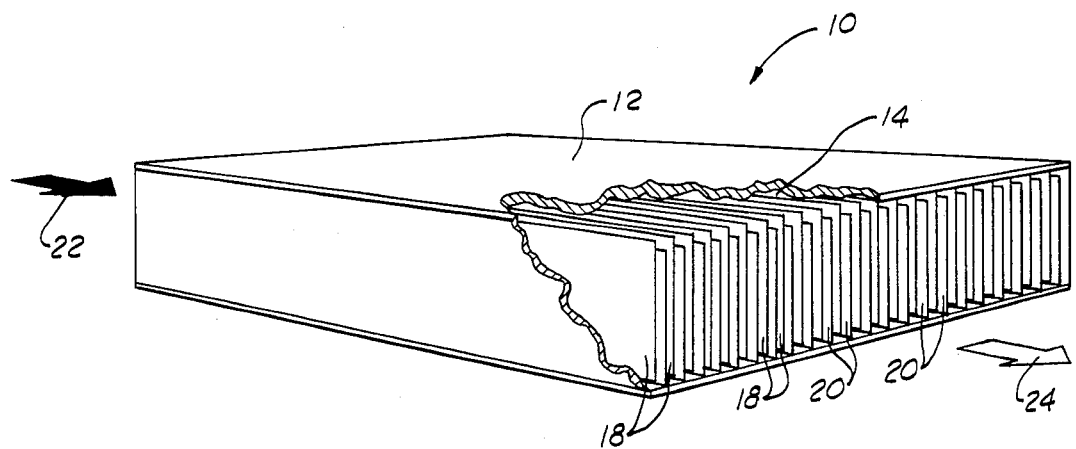
FIG. 1 is a perspective view of the apparatus for controlling dust particles by condensation enlargement.

In FIG. 1 a perspective view of the apparatus for controlling and dropping out dust particles by condensation enlargement is illustrated and designated by general reference numeral 10. The apparatus 10 includes a housing 12 having a hot water reservoir 14 disposed in the top thereof. The hot water reservoir 14 includes water inlets of hot water plates 18 mounted vertically in the housing 12. Indexed between each of the hot water plates 18 are a plurality of cold water plates 20. In FIG. 1 the apparatus 10 receives dust-laden air such as coal or any other foreign particles typically encountered in mining or other dust-producing operations. The dust-laden air is designated by arrow 22 with the clean air being discharged to the right of the housing 12 and indicated by arrow 24.

Figure 2:
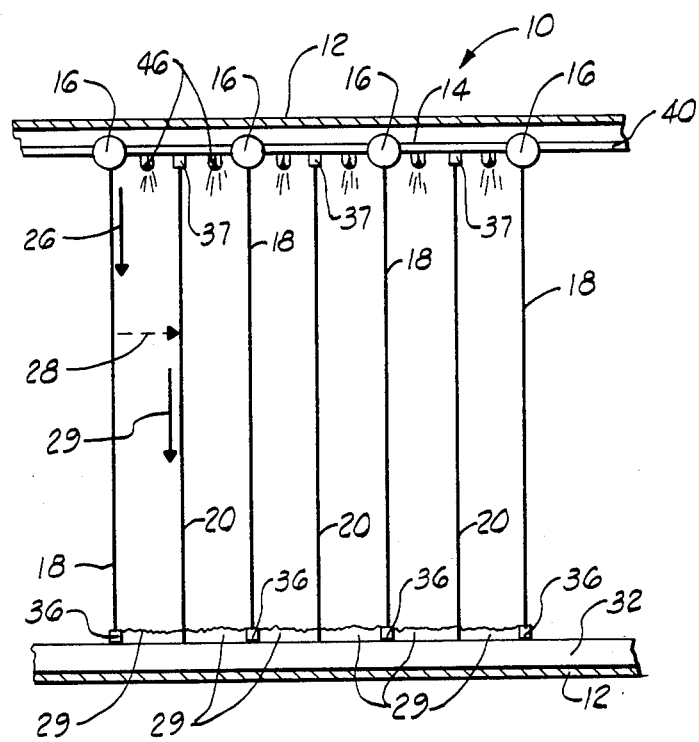
FIG. 2 is an end view of the apparatus showing a portion of the hot and cold plates.

In FIG. 2 an end view of the apparatus 10 is shown illustrating some of the hot plates 18 and cold plates 20 for receiving the dust-laden air. In this view, hot water can be seen introduced at the top of one of the hot plates 18 and indicated by arrow 26. As the hot water covers the surface of the sides of the hot plate 18 and travels downward across the surface of the plate, sufficient heat to enhance evaporation is provided by heaters 30 disposed in the hot water reservoir 14 as shown in FIG. 3. As the water evaporates as indicated by dotted line 28 it diffuses across the distance between the hot plate 18 and the cold plate 20 where it contacts the cool surface of the cold plate 20. The condensation of the water and dust particles is indicated by arrow 29. The condensation 29 is received in the bottom of the housing forming a dust water slurry which flows outwardly from the housing 12.

It should be noted in FIGS. 2 and 3 the cold plates 20 are connected at the bottom to a cold sink 32 having freon cooling coils 34 connected thereto. Also shown in FIG. 2 are insulators 36 at the bottom of the housing and adjacent the bottom of the hot plates 18 to prevent hot water from contacting the cold sink 32. In turn, the cold plates 20 include insulators 37 mounted at their upper end to prevent heat transfer from the heat source 40. To enhance the overall saturation of the surface of the hot plates 18, the plates may be covered with canvas 38 or any similar type material to assist the hot plates in the evaporation of the hot water received thereon. The housing 12 may also include insert insulators 42 to prevent hot water from dripping onto the cold sink 32.

Referring now to FIG. 4, a side view and top view of the dust-laden air indicated by arrow 22 is shown as the air is received between one of the hot plates 18 and cold plates 20.

When a dust particle shown as FIG. 44 and in the size range of less than one to several microns or greater travels from left to right, the particle 44 contacts the water vapor which is migrating from the hot plate 18 to the cold plate 20 as indicated by arrow 28. As the particle continues to travel the phenomenon of nucleation occurs with the particle 44 plus condensed vapor 29 thereon continues to grow until it reaches a size as large as ten microns or more which at this point may drop out and be received at the bottom of the housing 12 and be discharged therefrom.

Also shown in FIG. 4 and in FIG. 2 are water sprays 46 which introduce water at the exit end of the housing 12 to further capture the nucleated dust particles and condensed vapor. The water sprays 46 enhance the overall efficiency of the apparatus 10 and prevent fogging of the surrounding area. While water sprays 46 are shown it should be noted that other inertial type particle separators can be used equally well.

It has been found with even modest saturation ratios and maintaining a proper temperature differential between the hot plates 18 and cold plates 20, dust particles of an initial size less than one micron can be enlarged to seven microns or greater in approximately two seconds. Also, while the use of hot water is discussed any volatile liquid can be used with a pair of plates having a temperature differential between the surfaces of the plates.

Even a greater growth rate can be expected when proper saturation ratios are maintained.

The subject invention is significant because it is readily adaptable for various types of underground mining equipment and other types of dust control equipment while providing a means for the nucleating of dust particles less than one micron to as large as ten microns which heretofore were not controlled by prior art dust collecting devices.

Changes may be made in the construction and arrangement of the parts or elements of the embodiments as described herein without departing from the spirit or scope of the invention defined in the following claims.

What is claimed is:

1. A method for controlling and enhancing the control of dust-laden air by condensation enlargement, the steps comprising:

heating at least one first plate mounted in a housing;

cooling at least one second plate mounted in a housing and disposed in a spaced relationship to the first plate;

introducing a liquid on the first plate and vaporizing the liquid therefrom;

introducing the dust-laden air into the housing and between the first and second plates;

nucleating droplets and condensing the liquid vapor on dust particles as the vapor diffuses from the first plate to the second plate; and collecting a slurry of the condensed liquid and dust particles in the bottom of the housing and discharging the slurry therefrom.

2. The method as described in claim 1 further including preheating the liquid prior to introducing the liquid on the first plate.

3. The method as described in claim 1 further including spraying liquid at one end of the housing and between the first and second plates prior to the air exiting the housing and enhancing the removal of the nucleated dust particles and the condensing of the vaporized liquid.

4. An apparatus for controlling and enhancing the control of dust particles by condensation enlargement when dust-laden air is introduced therethrough, the apparatus comprising:

a plurality of first plates received in a housing, the first plates vertically mounted in the housing and disposed in a spaced relationship to each other;

a plurality of second plates mounted in the housing and indexed between each first plate and parallel thereto, the dust-laden air received between the first plates and second plates;

a liquid reservoir mounted on top of the housing and having at least one heater therein, the heater connected to a heat sink, the heat sink connected to one edge of the first plates;

a plurality of liquid inlets received in the liquid reservoir and connected to the top of the first plates, the hot liquid flowing downwardly by gravity across the opposite sides of the first plates, the first plates heated sufficiently to cause the liquid to vaporize;

a plurality of cooling coils connected to a cold sink, the cold sink connected to the bottom of the second plates, the cooling coils cooling the second plates sufficiently so a temperature differential between the plates provides for droplet nucleation and subsequent condensation of liquid vapor on the dust particles;

a plurality of liquid sprays mounted at one end of the housing; and the bottom of the housing disposed between the first and second plates providing means for collecting and discharging the condensed liquid with dust particles from the apparatus.

5. An apparatus for controlling and enhancing the control of dust particles by condensation enlargement when dust-laden air is introduced therethrough, the apparatus comprising:

a first plate mounted in a housing having an inlet for receiving the dust-laden air and an outlet for discharging the cleaned air, the first plate receiving a liquid thereon, the first plate heated sufficiently to cause the liquid to vaporize;

a second plate mounted in the housing, the second plate disposed adjacent and in a spaced relationship to the first plate, the dust-laden air received therebetween, the second plate cooled sufficiently so a temperature differential between the plates provides for droplet nucleation and subsequent condensation of liquid vapor on the dust particles; and means for collecting and discharging the condensed liquid with dust particles in the housing.

6. The apparatus as described in claim 5 further including a plurality of first plates mounted in the housing for receiving liquid thereon and a plurality of second plates mounted in the housing and indexed between each of the first plates.

7. The apparatus as described in claim 6 further including a plurality of liquid sprays disposed at one end of the housing.

8. The apparatus as described in claim 6 further including a heat source connected to the first plates, a cooling source connected to the second plates and a liquid reservoir mounted in the housing and communicating with the first plates for providing liquid thereto.

9. The apparatus as described in claim 8 wherein the liquid reservoir includes heaters for heating the liquid prior to introducing heated liquid to the first plates.

10. The apparatus as described in claim 8 wherein the heat source is a heat sink connected to one edge of the first plates and a cold sink connected at one edge to the second plates.

* * * * *